US012582973B2

(12) United States Patent
Kim et al.

(10) Patent No.: US 12,582,973 B2
(45) Date of Patent: Mar. 24, 2026

(54) SCR CATALYST HAVING EXCELLENT SULFUR TOLERANCE

(71) Applicants: POSCO, Pohang-si (KR); RESEARCH INSTITUTE OF INDUSTRIAL SCIENCE & TECHNOLOGY, Pohang-si (KR); SEOUL NATIONAL UNIVERSITY R&DB FOUNDATION, Seoul (KR)

(72) Inventors: Joon-Woo Kim, Gwangyang-si (KR); Dong-Jun Koh, Pohang-si (KR); Young-Chul Byun, Gwangyang-si (KR); Do-Heui Kim, Seoul (KR); Jong-Tae Lim, Gwangyang-si (KR); In-Hak Song, Gwangmyeong-si (KR); Hwang-Ho Lee, Seoul (KR); Se-Won Jeon, Seoul (KR)

(73) Assignees: POSCO HOLDINGS INC, Seoul (KR); RESEARCH INSTITUTE OF INDUSTRIAL SCIENCE & TECHNOLOGY, Pohang-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/606,978

(22) PCT Filed: Sep. 28, 2020

(86) PCT No.: PCT/KR2020/013233
§ 371 (c)(1),
(2) Date: Oct. 27, 2021

(87) PCT Pub. No.: WO2021/066463
PCT Pub. Date: Apr. 8, 2021

(65) Prior Publication Data
US 2022/0226803 A1 Jul. 21, 2022

(30) Foreign Application Priority Data
Sep. 30, 2019 (KR) ........................ 10-2019-0120527

(51) Int. Cl.
*F01N 3/20* (2006.01)
*B01J 21/06* (2006.01)
*B01J 23/22* (2006.01)
*B01J 29/70* (2006.01)

(52) U.S. Cl.
CPC ............. *B01J 29/70* (2013.01); *B01J 21/063* (2013.01); *B01J 23/22* (2013.01); *F01N 3/2066* (2013.01); *F01N 2570/14* (2013.01)

(58) Field of Classification Search
None
See application file for complete search history.

(56) References Cited

U.S. PATENT DOCUMENTS

| | | | | |
|---|---|---|---|---|
| 4,663,300 | A | * 5/1987 | Lester | ...................... B01J 29/24 502/66 |
| 2004/0224837 | A1 | 11/2004 | Horiuchi et al. | |
| 2009/0263304 | A1 | 10/2009 | Yoshida et al. | |
| 2011/0138789 | A1* | 6/2011 | Chapman | ............... B01J 23/002 60/302 |
| 2012/0328499 | A1* | 12/2012 | Ando | ................. B01D 53/9431 422/171 |
| 2018/0010500 | A1* | 1/2018 | Döring | .................. F01N 3/2066 |
| 2018/0280946 | A1* | 10/2018 | Alcove Clave | .......... B01J 29/48 |
| 2018/0280947 | A1 | 10/2018 | Biskupski et al. | |
| 2019/0314801 | A1 | 10/2019 | Malmberg et al. | |
| 2020/0088080 | A1 | 3/2020 | Malmberg et al. | |

FOREIGN PATENT DOCUMENTS

| | | |
|---|---|---|
| CN | 1575850 | 2/2005 |
| CN | 102139225 | 8/2011 |
| CN | 105163852 | 12/2015 |
| DE | 102018204690 | * 10/2018 |
| EP | 2338591 | * 12/2009 |
| EP | 2992956 | 3/2016 |
| EP | 3088082 | 11/2016 |
| JP | 2008221203 | 9/2008 |
| JP | 2016150280 | 8/2016 |
| JP | 2019048295 | 3/2019 |
| KR | 19960021149 | 7/1996 |

(Continued)

OTHER PUBLICATIONS

Castro-Munoz et al. "Progress on Incorporating Zeolites. . ". Membranes. 8, 30 (2018) (Year: 2018).*
Chinese Office Action—Chinese Application No. 202080034247.9 issued on Mar. 24, 2023, citing U.S. Pat. No. 4663300, CN 102139225, US 2018/0280946, CN 105163852, CN 1575850, and US 2018/0280947.
Guo, et al., Pore Size Expansion Accelerates Ammonium Bisulfate Decomposition for Improved Sulfur Resistance in Low-Temperature NH3-SCR, Acs Appl. Mater. Interfaces, 2019, vol. 11, pp. 4900-4907.
International Search Report—PCT/KR2020/013233 dated Jan. 6, 2021.
Chinese Office Action—Chinese Application No. 202080034247.9 issued on Oct. 28, 2023, citing Zhao et al.

(Continued)

*Primary Examiner* — Sheng H Davis
(74) *Attorney, Agent, or Firm* — CANTOR COLBURN LLP

(57) ABSTRACT

Provided is an SCR catalyst for removing nitrogen oxides ($NO_x$) from exhaust gas, comprising: 0.01-70 wt % of zeolite having an average pore size of 5 Å or more; 25-90 wt % of titanium dioxide ($TiO_2$); and 4-10 wt % of vanadium pentoxide ($V_2O_5$). The SCR catalyst according to the present invention exhibits denitrification performance in a low-temperature area that is superior to that of a conventional SCR catalyst, has improved tolerance for a sulfur compound, and also has an excellent regeneration rate.

5 Claims, 5 Drawing Sheets

(56)  References Cited

FOREIGN PATENT DOCUMENTS

| | | | |
|---|---|---|---|
| KR | 20060107757 | | 10/2006 |
| KR | 20090079882 | | 7/2009 |
| KR | 101219348 | | 1/2013 |
| KR | 20140131401 | | 11/2014 |
| KR | 20170107461 | | 9/2017 |
| KR | 20190091362 | | 8/2019 |
| KR | 20190091555 | | 8/2019 |
| WO | 2005047663 | | 5/2005 |
| WO | 2014027207 | * | 2/2014 |
| WO | 2016120841 | | 8/2016 |

OTHER PUBLICATIONS

Zhao et al., Environmental Protection Technology for Electric Power, China Electric Power Press, p. 129, Dec. 31, 2007.
European Search Report—European Application No. 20871897.3 issued on Oct. 28, 2022, citing WO 2014/027207 and EP 2992956.
Japanese Office Action—Japanese Application No. 2021-566518 issued on Nov. 1, 2022, citing JP 2008-221203, KR 10-2014-0131401, JP 2019-048295, and JP 2016-150280.

* cited by examiner

SCR CATALYST HAVING EXCELLENT SULFUR TOLERANCE

TECHNICAL FIELD

The present disclosure relates to a selective catalytic reduction (SCR) catalyst, and more particularly, an SCR catalyst capable of removing nitrogen oxides from exhaust gas containing a high-concentration sulfur compound.

BACKGROUND ART

In a boiler or combustion equipment using coal as a raw material, such as a combustion plant, a gas turbine, or a combustion engine, a raw material is exposed to a high temperature and combusted to generate a large amount of gas. Such exhaust gas may contain various harmful gases. An exhaust gas composition may include nitrogen, oxygen, carbon dioxides, and water generated in a general combustion process, and may include nitrogen oxides, sulfur oxides, hydrocarbon, carbon monoxide, and halogen compounds as harmful substances. Fine dust and acid rain are caused by nitrogen oxides and sulfur oxides under recent circumstance in which environmental issues regarding fine dust have emerged in society.

The harmful substances should be removed for protection of the environment. Accordingly, the exhaust gas is desulfurized by a wet or dry method, and then denitrified by a selective catalytic reduction (SCR) method to be discharged into the air.

In an SCR technology applied for denitrification treatment, for example, for reduction of nitrogen oxides, a temperature is raised using a burner to seta catalyst operating temperature, so that high fuel costs may be incurred. Accordingly, research into development of low-temperature operating SCR catalysts has been actively conducted to reduce fuel costs, and catalysts operating at around 200° C. have been applied.

The SCR technology uses ammonia as a reductant, and a reaction between ammonia and nitrogen oxide of an SCR catalyst bed may be performed according to the following reaction formula 1.

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O \qquad \text{[Reaction Formula 1]}$$

In the above reactions, ammonia which does not participate in the reduction of nitrogen oxide reacts with sulfur oxide in exhaust gas to produce ammonium salt. In the ammonium salt, ammonium bisulfate (ABS) is present in a liquid phase at a temperature of about 280° C., an SCR operating temperature, and fills pores of a catalyst to deteriorate performance of the catalyst.

DISCLOSURE

Technical Problem

An aspect of the present disclosure is to provide a catalyst having excellent resistance to catalyst deactivation caused by ammonia-sulfur compounds (AS and ABS) formed when an SCR catalyst operates in a low-temperature region.

An aspect of the present disclosure is to provide a catalyst having excellent resistance to catalyst deactivation caused by ammonium-sulfur compounds formed when a catalyst operates in a high-temperature region, as well as when the catalyst operates in a low-temperature region.

Technical Solution

According to an aspect of the present disclosure, a selective catalytic reduction (SCR) catalyst for removing nitrogen oxides ($No_x$) from exhaust gas includes: 0.01 to 70 weight percentage (wt %) of zeolite having an average pore size of 5 Å or more; 25 to 90 wt % of titanium dioxide ($TiO_2$); and 4 to 10 wt % of vanadium pentoxide ($V_2O_5$).

The exhaust gas may contain 300 ppm or more of a sulfur compound.

A temperature of the exhaust gas may be within a range of 180° C. to 400° C.

The SCR catalyst may further include 0.01 to 15 wt % of tungsten trioxide ($WO_3$).

The zeolite may not include a metal component.

A weight ratio of aluminum to silicon (Al:Si) of the zeolite may be 1:5 to 1:30.

The zeolite may be at least one selected from the group consisting of zeolite-Y, ZSM-5 zeolite, AEL zeolite, AFI zeolite, AFO zeolite, AFR zeolite, BEA zeolite, HEU zeolite, MFI zeolite, MOR zeolite, MEL zeolite, and MTW zeolite.

A conversion rate of nitrogen oxide in the exhaust gas may be 40 to 96% within a temperature range of 200 to 250° C.

The SCR catalyst may be regenerated within a temperature range of 240° C. or more.

Advantageous Effects

As set forth above, an SCR catalyst according to the present disclosure may exhibit excellent denitrification performance in a low-temperature region, as compared with a conventional SCR catalyst, and may have improved tolerance for a sulfur compound and an excellent regeneration rate.

BEST MODE FOR INVENTION

In the description below, example embodiments of the present disclosure will be described. However, embodiments of the present disclosure may be modified in various manners, and the scope of the present disclosure may not be limited to the embodiments described below. Also, the embodiments may be provided to more completely describe the present disclosure to a person of ordinary skill in the art.

The present disclosure relates to an SCR catalyst having excellent sulfur tolerance.

When an SCR technology is applied to remove nitrogen oxide from exhaust gas, ammonium sulfate (AS) and ammonium bisulfate (ABS), ammonium salts produced by reaction of sulfur oxide ($SO_x$) in exhaust gas and ammonia used as a reductant, may physically cover a catalyst or may fill pores to lose active sites, which is referred to as fouling. The AS and the ABS may be produced by the following reaction formulas 2 and 3.

$$SO_2 + 1/2O_2 \rightarrow SO_3$$

$$SO_3 + H_2O \rightarrow H_2SO_4$$

$$2\ NH_3 + H_2SO_4 \rightarrow (NH_4)_2SO_4 \qquad \text{[Reaction Formula 2]}$$

$$NH_3 + SO_3 + H_2O \rightarrow (NH_4)HSO_4$$

$$(NH_4)_2SO_4 \rightarrow (NH_4)HSO_4 + NH_3 \qquad \text{[Reaction Formula 3]}$$

AS and ABS, each having a solid form at a room temperature, may be melted at a temperature of about 147° C. to result in a phase change, may be present in a liquid state at a temperature of 270 to 280° C., and may fill pores of the catalyst. For this reason, active sites of the catalyst disposed in the pores may be lost to cause deactivation. However, when the ABS is exposed to a high temperature of 380° C. or more, the ABS may be decomposed.

In addition, poisoning in which active sites of a catalyst are sulfided by sulfur oxide may occur. More specifically, sulfur oxides $SO_2$ and $SO_3$, contained in exhaust gas, may be adsorbed to a support or an active metal of the catalyst to be present in the form of metal sulfide or sulfate to reduce lifetime of a catalyst, which is referred to as poisoning. Such fouling and poisoning may simultaneously occur. Accordingly, lifetime of an SCR catalyst may be significantly decreased in, in detail, exhaust gas in which sulfur oxides are contained in a large amount. In addition, when the nitrogen oxides in the exhaust gas are removed using a zeolite-containing catalyst, the zeolite may be weakened as the content of a sulfur compound is increased. Therefore, a zeolite-containing catalyst could not be used during removal of nitrogen oxides in exhaust gas in which a sulfur compound is contained in a large amount.

Figure 1:
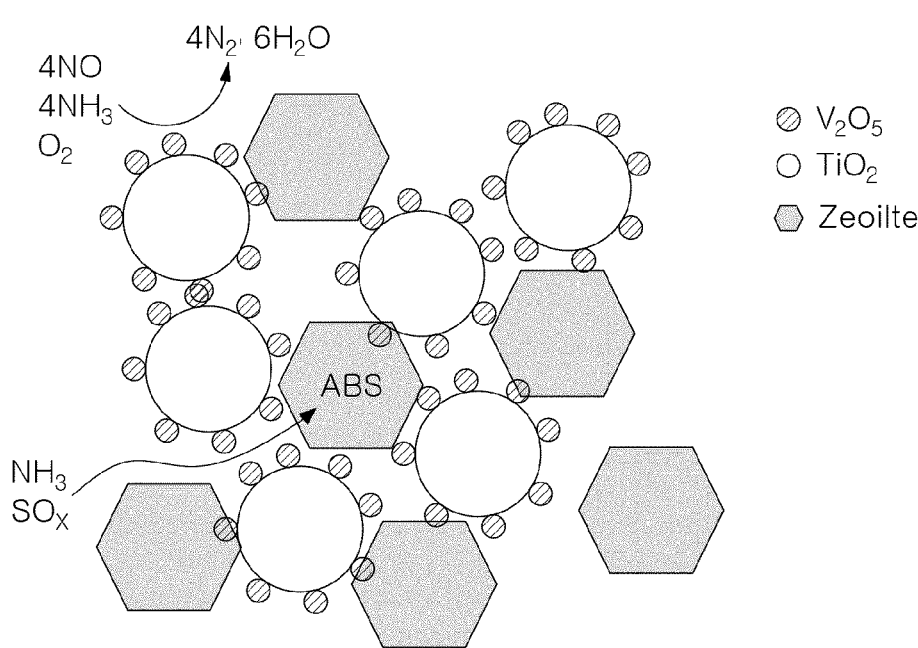
FIG. 1 is a schematic diagram of an SCR catalyst according to an example embodiment of the present disclosure.

FIG. 1 is a schematic diagram of an SCR catalyst according to an example embodiment of the present disclosure. Hereinafter, the present disclosure will be described in detail with reference to FIG. 1.

According to an aspect of the present disclosure, an SCR catalyst for removing nitrogen oxide ($NO_x$) in exhaust gas is provided. The SCR catalyst may include 0.01 to 70 weight percentage (wt %) of zeolite having an average pore size of 5 Å or more, 25 to 90 wt % of titanium dioxide ($TiO_2$) and 4 to 10 wt % of vanadium pentoxide ($V_2O_5$).

Referring to FIG. 1, the SCR catalyst according to the present disclosure may be a catalyst in which $TiO_2(V_2O_5/TiO_2)$ including $V_2O_5$ and zeolite are mixed. $V_2O_5/TiO_2$ may reduce nitrogen oxides through SCR reaction, and zeolite may preferentially intercalate sulfur compounds (AS, ABS, and the like), originating from $SO_x$, using acid sites and pores. Since $V_2O_5/TiO_2$ is relatively less deactivated by sulfur compounds (AS, ABS, and the like), SCR performance may be maintained. In addition, the zeolite may play a role in not only collecting sulfur compounds but also participating in the regeneration of the catalyst at a high temperature to be regenerated to initial activity.

The SCR catalyst according to the present disclosure may include 25 to 90 wt % of titanium dioxide ($TiO_2$), in detail, 40 to 70 wt % of titanium dioxide ($TiO_2$), based on the total weight of the SCR catalyst. When the content of titanium dioxide ($TiO_2$) is less than 25 wt %, the amount of a support capable of impregnating vanadium pentoxide ($V_2O_5$), an active ingredient, may be reduced to result in performance degradation. When the content of titanium dioxide ($TiO_2$) is greater than 90 wt %, the amount of zeolite may be decreased to result in poor tolerance for sulfur compounds.

In addition, the SCR catalyst according to the present disclosure may include 4 to 10 wt % of vanadium pentoxide ($V_2O_5$), in detail, 4 to 7 wt % of vanadium pentoxide ($V_2O_5$), based on the total weight of the SCR catalyst. When the content of vanadium pentoxide ($V_2O_5$) is less than 4 wt %, the amount of vanadium pentoxide ($V_2O_5$), an active ingredient, may be low, so that degradation of denitrification (De-$NO_x$) performance may occur. When the content of vanadium pentoxide ($V_2O_5$) is greater than 10 wt %, active metal dispersibility may be decreased due to the excessive amount of vanadium pentoxide ($V_2O_5$) to result in performance degradation.

In addition, the SCR catalyst according to the present disclosure may include 0.01 to 70 wt % of zeolite, in detail, 20 to 40 wt % of zeolite, based on the total weight of the SCR catalyst. When the content of zeolite is less than 0.01 wt %, tolerance for the sulfur compound may be reduced. When the content of zeolite is greater than 70 wt %, performance degradation may occur due to a decrease in the total amount of the SCR active ingredient of $V_2O_5/TiO_2$.

The zeolite may have an average pore size of, in detail, 5 Å or more and, in further detail, 5 Å to 20 Å. When the average pore size of the zeolite is less than 5 Å, a pore size is so small that AS, ABS, and the like, causing deactivation of the catalyst, may not pass through the zeolite. Thus, sulfur tolerance may not be secured.

An aluminum-to-silicon (Al:Si) weight ratio of zeolite, capable of securing sulfur tolerance, may vary depending on the type of zeolite, but may be, in detail, 1:5 to 1:50 and, in further detail, 1:5 to 1:30. When the weight ratio is outside of the above range, the sulfur tolerance may be deteriorated by a decrease in absorption sites or acid sites of $SO_2$, AS, ABS, or the like.

According to an example embodiment, the zeolite may be, in detail, zeolite which does not contain a metal component. In the present disclosure, the term "metal component" refers to a component including iron, cobalt, nickel, copper, chromium, zinc, manganese, or the like. In the zeolite containing a metal component, a metal, an active site, may react with $SO_2$, or the like, to be significantly easily converted into sulfate. In the present disclosure, by using a zeolite to which no metal component is added, generation of metal sulfate may be prevented to suppress performance degradation of the zeolite. In addition, sulfur compounds (AS, ABS, and the like), originating from $SO_2$, may be preferentially adsorbed to allow $V_2O_5/TiO_2$ to maintain denitrification performance.

Zeolite, applicable to the present disclosure, is not limited, but may be at least one selected from the group consisting of, for example, zeolite-Y, ZSM-5 zeolite, AEL zeolite, AFI zeolite, AFO zeolite, AFR zeolite, BEA zeolite, HEU zeolite, MFI zeolite and may be, in detail, zeolite-Y.

An SCR catalyst according to the present disclosure may be a promoter, and may include 0.01 to 15 wt % of tungsten trioxide ($WO_3$) based on the total weight of the SCR catalyst, in detail, 1 to 10 wt % weight of tungsten trioxide ($WO_3$). When the content of tungsten trioxide ($WO_3$) is less than 0.01 wt %, low-temperature SCR performance may be degraded. When the content of tungsten trioxide ($WO_3$) is greater than 15 wt %, tungsten dispersibility may be reduced to degrade oxidation performance.

Tungsten has excellent oxidation performance, allowing catalyst performance at a low temperature to be improved. However, since tungsten oxidizes $SO_2$ to $SO_3$, tungsten is not often used for commercial catalysts. For example, ammonium bisulfate (ABS), a poisoning substance most important in deactivating an SCR catalyst, originates from $SO_3$. In the present disclosure, since formed ABS may be preferentially adsorbed to zeolite, the ABS may not be poisoned to $V_2O_5/TiO_2$. Therefore, the SCR catalyst may maintain performance, and thus, may contribute to only improvement of low-temperature performance without being affected by $SO_2$ oxidation even when the SCR catalyst includes tungsten.

The SCR catalyst according to the present disclosure may be used to remove nitrogen oxides from exhaust gas containing 30 ppm or more of sulfur compounds. As described above, zeolite may be used to remove nitrogen oxides in diesel engine exhaust gas having a sulfur content of usually 10 ppm or less, but zeolite was not used to remove nitrogen oxides from exhaust gas containing 30 ppm or more of sulfur. However, the present disclosure may find an optimum content of zeolite, an average pore size of the zeolite, and an aluminum-to-silicon (Al:Si) weight ratio to provide an SCR catalyst, capable of removing nitrogen oxides from the exhaust gas containing 30 ppm or more of sulfur.

The exhaust gas containing 30 ppm or more of sulfur compound is not limited, but may be, for example, exhaust gas generated during a sintering process of a steel mill, thermoelectric power plant exhaust gas, incinerator exhaust gas, and marine engine exhaust gas, or the like. The SCR catalyst according to the present disclosure may be appropriately used for the exhaust gas.

A temperature of the exhaust gas may be 180° C. to 400° C. In other words, an operating temperature of the catalyst according to the present disclosure may be 180° C. to 400° C. In general, an operating temperature of a $V_2O_5/TiO_2$-based SCR catalyst is 310° C. to 340° C., but exhaust gas post-treatment equipment such as a steel mill sintering plant or a ship is required to have excellent performance in a temperature range of 200° C. to 250° C. As described above, in the present disclosure, the ABS, or the like, is preferentially occluded in pores of the zeolite in a 180° C. to 280° C. region in which the ABS, or the like, is present in a liquid state, so that SCR catalyst activity may be maintained.

The SCR catalyst according to the present disclosure may exhibit an excellent effect in which a conversion rate of nitrogen oxide in exhaust gas is 40% to 96% within a temperature range of 200° C. to 250° C. In addition, within a temperature range of 240° C. or more, ABS adsorbed in zeolite pores may be gradually decomposed through zeolite acid sites and catalytic activity may be regenerated.

MODE FOR INVENTION

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom.

Embodiment

1. Evaluation of Nitrogen Oxide Conversion Rate According to Content of $V_2O_5$

Preparation Example 1

$TiO_2$ was used as a support and a solution, in which ammonium metavanadate was dissolved in oxalic acid, was prepared using an impregnation method and dried and then sintered at a temperature of 500° C. for 4 hours to prepare a catalyst containing 4 wt % of $V_2O_5$ and 96 wt % of $TiO_2$.

Preparation Example 2

A catalyst was prepared in the same manner as in Preparation Example 1, except that the content of $V_2O_5$ was controlled to be 5 wt %.

Preparation Example 3

A catalyst was prepared in the same manner as in Preparation Example 1, except that the content of $V_2O_5$ was controlled to be 7 wt %.

Preparation Example 4

A catalyst was prepared in the same manner as in Preparation Example 1, except that the content of $V_2O_5$ was controlled to be 10 wt %.

Comparative Preparation Example

A catalyst was prepared in the same manner as in Preparation Example 1, except that the content of $V_2O_5$ was controlled to be 3 wt %.

The catalysts of Preparation Examples 1 to 4 and Comparative Preparation Example 1 had a space velocity of 100,000 $h^{-1}$, and were applied to exhaust gas having a composition including 500 ppm of $NH_3$, 500 ppm of NO, 10% of $O_2$, 5% of $CO_2$, 10% of $H_2O$, and a balance of $N_2$. In addition, nitrogen oxide conversion rates were measured and illustrated in FIG. 2.

Figure 2:
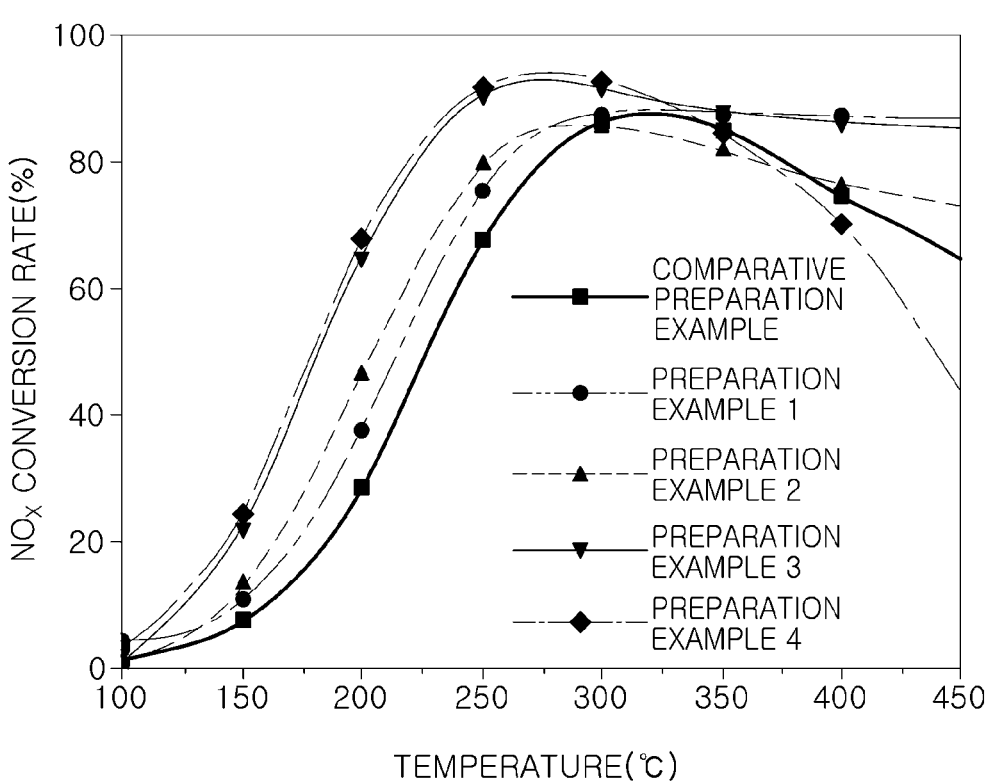
FIG. 2 illustrates results of nitrogen oxide conversion rate experiments of SCR catalysts according to Preparation Examples 1 to 4 and Comparative Preparation Example 1.
Figure 3:
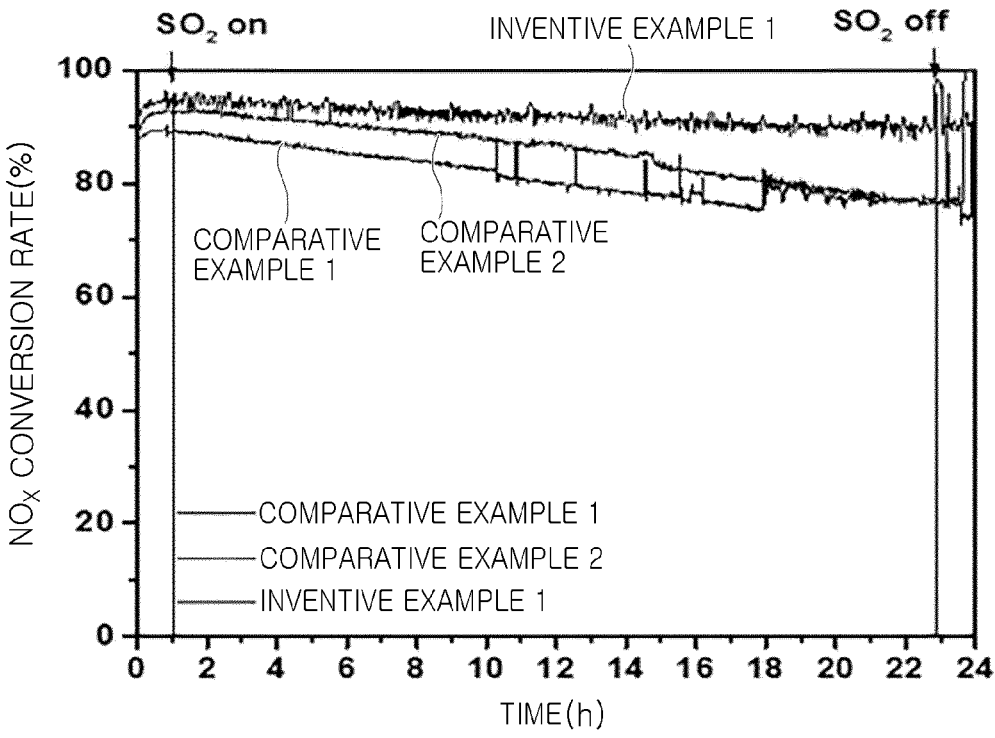
FIG. 3 illustrates results of tolerance evaluation experiments of SCR catalysts according to Inventive Example 1, Comparative Example 1, and Comparative Example 2 for a sulfur compound.

Referring to FIG. 2, the catalyst according to Comparative Preparation Example containing 3% of $V_2O_5$ exhibited a low nitrogen oxide conversion rate of 20% to 70% in a 200° C. to 250° C. region, and when the content of $V_2O_5$ was increased, a nitrogen oxide conversion rate at a temperature of 200° C. to 250° C. was increased. The catalyst according to Preparation Example 3 exhibited a high nitrogen oxide conversion rate of 75% at a temperature of 200° C. and 96% at a temperature of 250° C., and when the content of $V_2O_5$ was increased to exceed 10%, performance was rather degraded.

2. Evaluation of Tolerance for Sulfur Compounds

An evaluation of sulfur tolerance was performed using the catalyst according to Preparation Example 3. Specifically, a catalyst prepared by mixing 7 wt % of $WO_3$ with the catalyst according to Preparation Example 3 was indicated as Comparative Example 1, a catalyst prepared by mixing 7 wt % of $WO_3$ and 30% of the total weight of ZSM-5 zeolite with the catalyst according to Preparation Example 3 was indicated as Inventive Example 1, and a catalyst prepared by mixing 7 wt % of $WO_3$ and 30% of the total weight of silica with the catalyst according to Preparation Example 3 was indicated as Inventive Example 2. Hereinafter, a process of evaluating tolerance for sulfur compounds will be described.

To evaluate denitrification performance at a temperature of 200° C. and to deactivate a catalyst, the amount of NH3 was increased at the same temperature and SO2 was added to form a sulfur compound. Tolerance for the sulfur compound was evaluated by performing deactivation for 24 hours, evaluating denitrification performance at the same temperature, and exposing a catalyst to various temperatures to evaluate whether the catalyst was generated. Each regeneration temperature was divided into 270° C., a normal operating temperature in a sintering process, 310° C., a maximum temperature which could be raised, and 380° C., a temperature at which ABS was decomposed. Process conditions for evaluating tolerance for a sulfur compound are summarized and listed in Table 1, and experimental results of tolerance for sulfur compounds of Inventive Example 1, Comparative Example 1, and Comparative Example 2 were listed in Tables 2 and 3.

described above, zeolite was considered to preferentially absorb AS and ABS, such that performance of $V_2O_5/TiO_2$ was maintained. Then, the catalyst was regenerated at each temperature. The catalyst showed a high regeneration rate at a temperature of 310° C., and was generated by almost 100% at a temperature of 380° C.

Similarly to the catalyst according to Comparative Example 1, the catalyst according to Comparative Example 2 encountered performance degradation in a deactivation section, and was slightly increased in performance after being generated at a temperature of 380° C.

3. Evaluation of Tolerance for Sulfur Compounds According to Average Pore Size of Zeolite In addition to the catalysts of Comparative Example 1 (not including zeolite) and Example 1 (including zeolite ZSM-5 having an average pore size of 5 Å) used for the evaluation of tolerance for sulfur compounds, a catalyst prepared by mixing 30% of the total weight of zeolite Y having an average pore size of 7 Å with the catalyst according to Preparation Example 3 was indicated as Inven-

TABLE 1

| | Performance Evaluation | DA | Performance Evaluation | RG 1 | RG 2 | RG 3 |
|---|---|---|---|---|---|---|
| TMP [° C.] | 220 | 220 | 220 | 270 | 310 | 380 |
| Time [h] | 1 | 22 | 1 | 1 | 1 | 1 |
| NO [ppm] | 500 | 600 | 500 | 0 | 0 | 0 |
| NH$_3$ [ppm] | 500 | 500 | 500 | 0 | 0 | 0 |
| SO$_2$ [ppm] | 0 | 30 | 0 | 0 | 0 | 0 |
| O$_2$ [ % ] | 10 | 10 | 10 | 10 | 10 | 10 |
| CO$_2$ [%] | 5 | 5 | 5 | 5 | 5 | 5 |
| H$_2$O [%] | 10 | 10 | 10 | 10 | 10 | 10 |
| N$_2$ [%] | | | Balance gas | | | |
| SV [h$^{-1}$] | 100,000 | 100,000 | 100,000 | 100,000 | 100,000 | 100,000 |

TMP: Temperature
SV: Space Velocity
DA: Deactivation
RG: Regeneration

TABLE 2

| Catalysts | 220° C. Performance Evaluation (%) | DA (%) | 270° C. RG (%) | 310° C. RG (%) | 380° C. RG (%) |
|---|---|---|---|---|---|
| CE 1 (7 V/WTi) | 90.3 | 75.6 | 77.6 | 82.1 | 89.3 |
| IE 1 (7 V/WTi + ZSM-5) | 95.9 | 89.9 | 90.7 | 91.8 | 94.2 |
| CE 2 (7 V/WTi + Silica) | 90.4 | 76.1 | 78.7 | 82.0 | 88.7 |

CE: Comparative Example
IE: Inventive Example
DA: Deactivation
RG: Regeneration

Referring to Tables 2 and 3, initial performance of the catalyst according to Comparative Example 1 showed a nitrogen oxide conversion rate of about 90%, but performance thereof was degraded as deactivation was performed, so that the nitrogen oxide conversion rate was decreased to about 75%. Then, the catalyst was regenerated at each temperature and performance was recovered by 2% at a temperature of 270° C. As a temperature was increased, performance was recovered and the catalyst was regenerated by 100% at a temperature of 380° C. On the other hand, initial performance of the catalyst according to Inventive Example 1 was about 95%, and performance thereof was degraded by only about 5% during deactivation. As tive Example 2, and a catalyst prepared by mixing 30% of the total weight of CHA zeolite having an average pore size of 3.5 Å with the catalyst according to Preparation Example 3 was indicated as Example 3. Then, evaluation of tolerance for sulfur compounds according to a zeolite average pore size was performed in the same manner as described above, and results of the evaluation are illustrated in FIG. 4.

Figure 4:
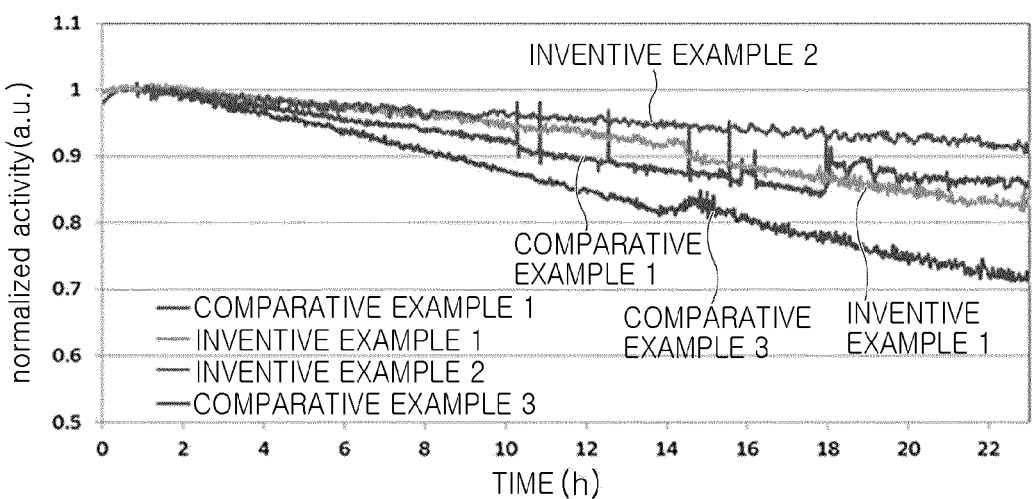
FIG. 4 illustrates results of tolerance evaluation experiments of SCR catalysts according to Inventive Example 1, Inventive Example 2, Comparative Example 1, and Comparative Example 3 for a sulfur compound.

Referring to FIG. 4, the order of excellent tolerance was as follows: "Inventive Example 2" including Y zeolite having an average pore size of 7 Å→"Inventive Example 1" including zeolite ZSM-5 having an average pore size of 5 Å→"Comparative Example 1" not including zeolite→"Comparative Example 3" including CHA zeolite having an average pore size of 3.5 Å. In the case of CHA, AS and ABS, deactivated materials, are not considered to pass therethrough due to significantly small pores.

Figure 5:
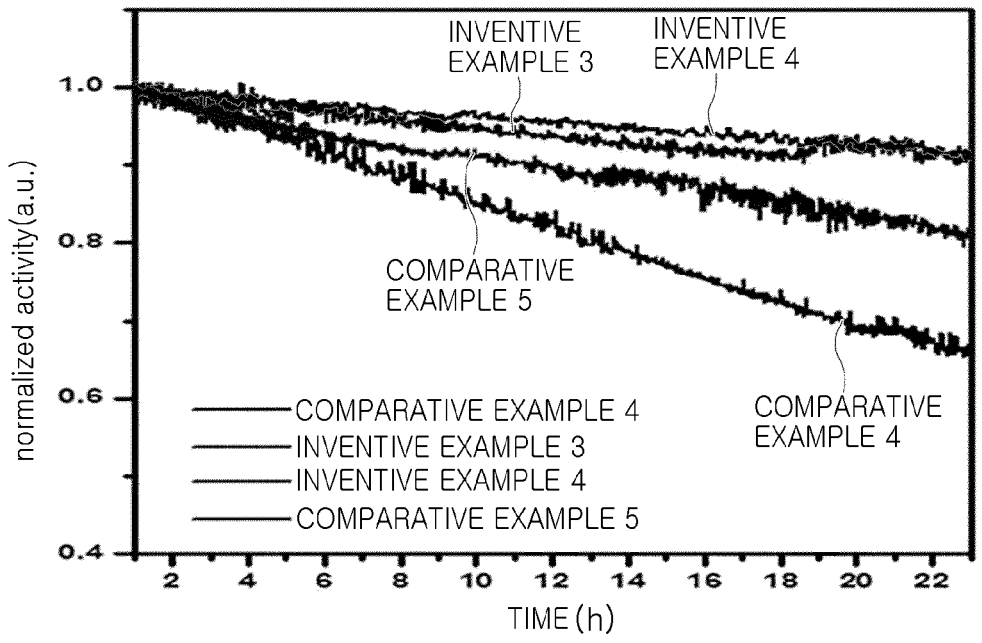
FIG. 5 illustrates results of tolerance evaluation experiments of SCR catalysts according to Inventive Example 3, Inventive Example 4, Comparative Example 4, and Comparative Example 5 for a sulfur compound.

4. Evaluation of Tolerance for Sulfur Compounds According to Content of Zeolite Si/Al Catalysts were prepared using Y zeolite, having various Si/Al contents, to perform evaluation of tolerance for sulfur compounds according to the zeolite Si/Al content in the same manner as described above, and results of the evaluation are illustrated in FIG. 5. Compositions of Examples 3 and 4 and Comparative Examples 3 and 4 and weight ratios of Si/Al are as follows (Inventive Example 3: 5 wt % of $V_2O_5$, 7 wt % of $WO_3$, 59.5 wt % of $TiO_2$, 30 wt % of Y zeolite, and Si/Al=5, Inventive Example 4: 5 wt % of $V_2O_5$, 7 wt % of WO$_3$, 59.5 wt % of TiO$_2$, 30 wt % of Y zeolite, and Si/Al=12, Comparative Example 4: 5 wt % of V$_2$O$_5$, 7 wt % of WO$_3$, 59.5 wt % of TiO$_2$, and 30 wt % of silica, Comparative Example 5: 5 wt % of V$_2$O$_5$, 7 wt % of WO$_3$, 59.5 wt % of TiO$_2$, 30 wt % of Y zeolite, and Si/Al=60).

Referring to FIG. 5, in the case of Inventive Examples 3 and 4 having Si:Al contents, tolerance for sulfur compounds was excellent and a high Si/Al ratio of 60 tended to decrease the tolerance. From this, it is confirmed that the amount of Al was decreased, and thus, adsorption sites of SO$_2$ or AS and ABS are decreased to lower the tolerance.

5. Evaluation of Tolerance for Sulfur Compounds with Commercial Catalyst

Figure 6:
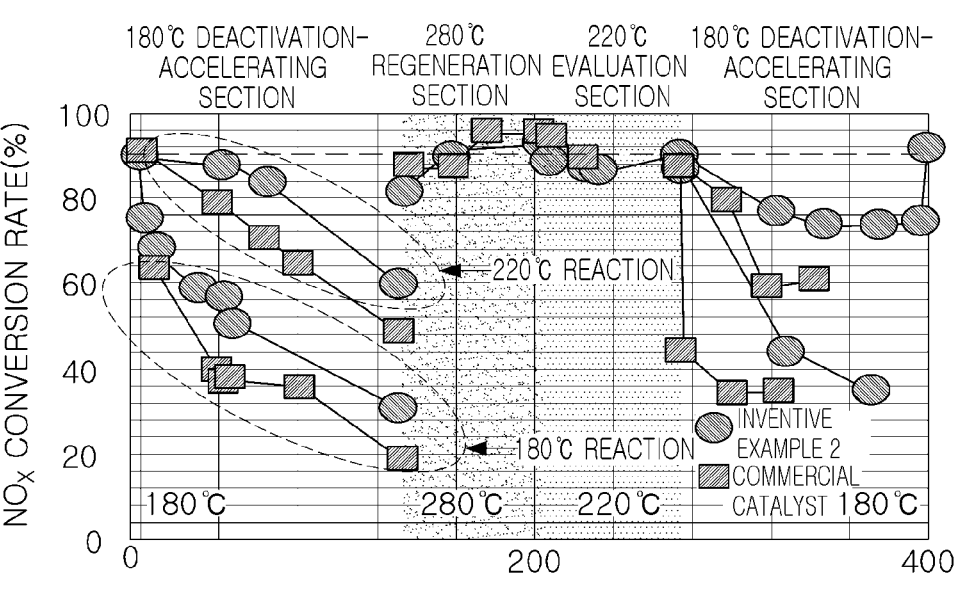
FIG. 6 illustrates results of tolerance evaluation experiments of an SCR catalyst according to Inventive Example 2 and a commercial catalyst for a sulfur compound.

Tolerance of the catalyst according to Inventive Example 2 and a commercial catalyst (5 wt % of V$_2$O$_5$ and 95 wt % of TiO$_2$) were evaluated using exhaust gas of an actual steelmaking sintering furnace. The used catalyst had a size of 150×150×600 (width×length×height), and was generally prepared to have a commercial catalyst unit module size and tolerance thereof was evaluated. An exhaust gas composition may vary depending on a sintering furnace operating environment, but generally includes 160 to 250 ppm of NO, 250 ppm of NH$_3$, 50 to 100 ppm of SO$_2$, 15% of O$_2$, 6% of CO$_2$, 10% of H$_2$O, and various impurities. A flow rate used in the catalyst evaluation was an average of 100 Nm$^3$/h, and a space velocity was 5,500 to 6,000 h$^{-1}$. Tolerance evaluation was performed under conditions listed in Table 3 using the catalyst according to Inventive Example 2 and a commercial catalyst, and results of the evaluation are illustrated in FIG. 6.

TABLE 3

| | Performance Evaluation | DA | Performance Evaluation | RG | Performance Evaluation |
|---|---|---|---|---|---|
| TMP [° C.] | 220 | 180 | 220 | 280 | 220 |
| Time [h] | 2 | 120 | 2 | 72 | 72 |

TMP: Temperature
DA: Deactivation
RG: Regeneration

Referring to FIG. 6, both the catalyst according to Inventive Example 2 and the commercial catalyst exhibited similar performance at a temperature of 220° C. Deactivation was performed at a temperature of 180° C., at which AS and ABS were formed well, for 120 hours to accelerate the deactivation, and performance at a temperature of 220° C. was evaluated every 30 to 50 hours. In an accelerated evaluation of deactivation of exposure to 180° C., performance degradation of each catalyst after exposure of about 50 hours occurred as follows: performance of a commercial catalyst was decreased by 50% from 90%, initial performance of each catalyst, to be 40%, and performance of the catalyst according to Inventive Example 2 was decreased by about 35% from 90% to be about 55%. After exposure of 130 hours, the commercial catalyst exhibited performance of 20% or less, and the catalyst according to Inventive Example 2 exhibited performance of 30%. In addition, when performance at a temperature of 220° C. during deactivation was evaluated, tolerance times during which performance of 70% satisfying the gas emission regulation was maintained were compared with each other. The tolerance time of the commercial catalyst was about 70 hours, and the tolerance time of the catalyst according to Inventive Example 2 was about 100 hours. Accordingly, it is confirmed that the catalyst according to Inventive Example 2 had 30% better tolerance than the catalyst. On the other hand, regeneration performance was evaluated by exposing corresponding catalysts to a temperature of 280° C. under the same inlet gas condition. At the temperature, the commercial catalyst exhibited 95% of denitrification performance and the catalyst according to Inventive Example 2 exhibited 92% of denitrification performance. After 72 hours of catalyst regeneration, each catalyst was regenerated by 100% at a temperature of 220° C. and performance thereof was maintained for 72 hours. In the previous laboratory evaluation, a catalyst was recovered by 100% only at a temperature of 380° C., but was recovered under actual exhaust gas exposure conditions even at a temperature of 280° C.

A catalyst, from which ABS was removed while passing through a regeneration section, was evaluated at a temperature of 220° C. for about 50 hours, and both catalysts maintained performance of 90%. Then, both catalysts were subjected to deactivation acceleration evaluation at a temperature of 180° C. The commercial catalyst was significantly rapidly deactivated at the temperature of 180° C., but the catalyst according to Example Embodiment 2 exhibited more than twice of tolerance. In addition, the performance of the catalyst according to Inventive Example 2 at the temperature of 220° C. was continuously maintained by 70% or more.

While examples embodiments in the present disclosure have been described in detail, however, claims of the present disclosure are not limited thereto, and it will be apparent to those skilled in the art that various modifications and changes may be made without departing from the technological concepts of the present disclosure described in the claims.

The invention claimed is:

1. A selective catalytic reduction (SCR) catalyst for removing nitrogen oxides from exhaust gas, the SCR catalyst consisting of:
    20 to 40 weight percentage of zeolite-Y having pores, the pores having an average pore size of 5 Å or more;
    40 to 70 wt % of titanium dioxide;
    4 to 10 wt % of vanadium pentoxide; and
    0.01 to 15 wt % of tungsten trioxide,
    wherein the zeolite-Y does not include iron, cobalt, nickel, copper, chromium, zinc, and manganese, and
    wherein a weight ratio of aluminum to silicon of the zeolite-Y is 1:5 to 1:12.

2. The SCR catalyst of claim 1, wherein the exhaust gas contains 300 ppm or more of a sulfur compound.

3. The SCR catalyst of claim 1, wherein a temperature of the exhaust gas is within a range of 180° C. to 400° C.

4. The SCR catalyst of claim 1, wherein a conversion rate of nitrogen oxide in the exhaust gas is 40 to 96% within a temperature range of 200 to 250° C.

5. The SCR catalyst of claim 1, wherein the SCR catalyst is regenerable within a temperature range of 240° C. or more.

* * * * *